UNITED STATES PATENT OFFICE 2,070,076

SEPARATION OF MOLYBDENITE FROM COPPER SULPHIDES

Earl H. Brown, Palo Alto, Calif., assignor to Minerals Separation North American Corporation, New York, N. Y., a corporation of Maryland No Drawing. Application July 13, 1935, Serial No. 31,154

32 Claims. (Cl. 209—167)

The present invention relates in general to ore concentration by flotation, and more particularly to the separation of molybdenite (molybdenum sulphide) from copper sulphides by selective flotation of the copper sulphides.

According to the invention, this separation is effected by agitating a pulp of the material containing the molybdenite and copper sulphides, in the presence of an organic protective colloid acting to depress the molybdenite, other agents being also present in the pulp to effect flotation of the copper sulphides. By the use of such colloid, flotation of the molybdenite is only temporarily inhibited. That is, the molybdenite remains in the pulp in such state that its subsequent flotation, if desired, may be readily carried out.

It is already known that organic protective colloids, such as starch, glue, etc., have the effect of inhibiting the flotation of such non-metallic minerals as mica, talc, etc., and their use is also known in the flotation concentration of coal. It is further known that these organic substances, if used in sufficient quantity, will completely prevent the flotation of sulphide minerals in general. The basis of the invention, however, is the discovery that organic protective colloids, if employed in relatively small quantities, have the effect of inhibiting flotation of molybdenite while not preventing flotation of copper sulphides, so that the latter may be removed in the usual way as a flotation concentrate containing only a small amount of molybdenite. Moreover, an important advantage of the invention resides in the fact that the differential inhibiting action provided by the colloid takes place with respect to each of the copper sulphides which may be present in the material treated, so that that may be all successfully floated away from the molybdenite. In this manner it has been found that high recovery of molybdenite may also be obtained.

Any organic substance acting as a protective colloid in the pulp may be used to selectively inhibit flotation of the molybdenite. Successful tests have thus been carried out with starch, dried blood, licorice root, saponin, dextrose, casein, animal glue, gelatine, whey, dextrine, etc. These substances are of course not all equally effective, but satisfactory results may nevertheless be obtained with each.

Starch has been found particularly effective, since its use makes possible the flotation of a copper concentrate containing very little molybdenum. Moreover, subsequent flotation of the molybdenite is most easy, and its recovery is usually almost complete. In some cases it has been found that improved results may be obtained if the starch is dissolved in a small amount of caustic soda. In view of the greater solubility of starch in caustic soda, such a solution is much less viscous than an ordinary water solution of the same strength, which permits easier feeding to the pulp. Still further advantages of a caustic starch solution are that it can be kept for a longer period of time without spoiling; and, in view of its greater effectiveness, a reduced quantity of starch may be used to produce an effect equal to that obtained with a water solution. Good results may nevertheless be obtained with a simple water solution.

A method which has been found satisfactory in the preparation of a caustic starch solution for use according to the invention, consists in adding just enough cold water to starch to form a paste, and in then adding sufficient caustic soda to form a mixture containing 20 parts of caustic soda and 80 parts of starch. This mixture is then diluted with water to form a 5% solution, which after being heated to the boiling point and left to cool is ready for use. When a water solution of starch is to be used, it may be prepared by first forming a paste of starch with cold water, and then adding more cold water until the desired degree of dilution is reached. The resulting mixture is then brought to the boiling point and cooled for use.

Where the copper sulphides are to be directly floated away from both gangue and molybdenite, the colloid may be added during the preliminary operation of grinding the ore, or during the conditioning of the pulp prior to actual flotation of the copper sulphides. In certain cases, however, it may be desirable to first produce a primary concentrate of molybdenite and copper sulphides, and in these cases the colloid may be added at any time during the retreatment of that concentrate prior to actual flotation of the copper sulphides.

For floating the copper sulphides, any reagents known in the art may be used in association with the protective colloid. Pine oil may thus be used as a frother and an alkali xanthate as a collector, although other collector types, such as aerofloats, may also be employed with satisfactory results. The invention may be carried out in either alkaline, neutral, or acid pulps, although in general best results are obtained by employing alkaline pulps. The alkalinity may be produced by the addition to the pulp of soda ash, lime, or other alkali. Lime is preferred for the purpose, however, as it has been found to also depress the molybdenite to some extent. It thus enhances the effect of the protective colloid, so that a reduced quantity of the colloid is made possible.

Subsequent flotation of the molybdenite may likewise be effected by any well known method, such as the addition of small amounts of pine oil and kerosene. However, other well known promoters, such as alkali xanthates, may also be used to facilitate the flotation of the molybdenite. Although an acid pulp may be used to float the copper sulphides, a better recovery of molybdenite is usually obtained if the pulp is made alkaline prior to the flotation of the molybdenite; and it has also been found that by the addition of a small amount of tannic acid almost complete recovery of the molybdenite is insured.

In applying the invention to the retreatment of primary concentrates of molybdenite and copper sulphides, while the colloid is effective in selectively inhibiting flotation of the molybdenite, the addition at the same time of a small amount of a soluble lead salt assists in the flotation of the copper sulphides, especially chalcocite. When such concentrates are of high grade, it is obviously unnecessary to float the molybdenite. That is, the copper sulphides are floated and removed, and the tailings resulting from this flotation themselves constitute a molybdenum concentrate.

The use of the colloid has no deleterious effect on the recovery of any gold that may be present in the ore treated. In fact, the recovery of gold is rather higher as a result of such use.

Examples will now be given describing certain tests which have been made in carrying the invention into effect. In each of these examples the reagent amounts given refer to proportions figured on the basis of the dry weight tonnage of the material treated.

*Example I.*—A material obtained by flotation concentration and consisting mainly of molybdenite and copper sulphides, including both chalcocite and chalcopyrite, was made up with water to a pulp of about 15% solids, and this pulp was agitated with 2.28 pounds of a mixture of starch and caustic soda containing 20 parts of caustic soda to 80 parts of starch, which mixture was added as a 5% water solution prepared as above described, the period of agitation being five minutes, including the time taken for adding the water-caustic-starch solution. After this mixing the pulp was further conditioned for two minutes with 0.14 pound of potassium ethyl xanthate and 0.1 pound of Hercules Yarmor pine oil, and was thereafter treated for the production of a froth in a subaeration flotation machine, the frothing period in the machine being ten minutes. As shown by the following table, a large proportion of the copper sulphides was floated, leaving most of the molybdenite in the tailings.

|  | Weight, percent | Percent assays | | Percent distribution | |
|---|---|---|---|---|---|
|  |  | Cu | MoS$_2$ | Cu | MoS$_2$ |
| Heads | 100 | 7.39 | 82.34 | 100 | 100 |
| Conc. | 15.6 | 41.96 | 3.30 | 82.9 | 0.6 |
| Tails. | 84.4 | 1.48 | 96.99 | 17.1 | 99.4 |

*Example II.*—A pulp of the same material and of the same consistency as indicated in Example I was first conditioned for five minutes with an amount of the same water-caustic-starch solution corresponding to 2.25 pounds of the caustic-starch mixture contained therein, further conditioned for two minutes with 0.22 pound of potassium ethyl xanthate and 0.11 pound of Hercules Yarmor pine oil, and then frothed in the flotation machine for twenty minutes, the results being as follows:

|  | Weight, percent | Percent assays | | Percent distribution | |
|---|---|---|---|---|---|
|  |  | Cu | MoS$_2$ | Cu | MoS$_2$ |
| Heads | 100 | 8.36 | 81.44 | 100 | 100 |
| Conc. | 16.0 | 41.16 | 5.5 | 78.7 | 1.1 |
| Tails. | 84.0 | 2.12 | 95.9 | 21.3 | 98.9 |

*Example III.*—A pulp of the same material and of the same consistency as indicated in Example I was conditioned for five minutes with an amount of the same water-caustic-starch solution corresponding to 2.26 pounds of the caustic-starch mixture contained therein, and thereafter for two minutes with 0.11 pound of potassium amyl xanthate and 0.06 pound of Hercules Yarmor pine oil. Since there was a tendency for molybdenite to float, the pulp was further conditioned for five minutes with an additional amount of the same water-caustic-starch solution corresponding to 1.13 pounds of the caustic-starch mixture contained therein, whereupon it was frothed in the flotation machine for ten minutes. Thereafter, it was further conditioned for two minutes with 0.6 pound of potassium amyl xanthate and 0.57 pound of lead acetate, again frothed in the flotation machine for five minutes, still further conditioned for a few seconds with 0.57 pound of lead acetate, and finally frothed in the flotation machine for another five minutes. By inspection the lead acetate was seen to assist in floating slowly rising chalcocite. The results are indicated in the following table, from which it is seen that most of the copper sulphides were floated away and that the tailings consisted mainly of molybdenite:

|  | Weight, percent | Percent assays | | Percent distribution | |
|---|---|---|---|---|---|
|  |  | Cu | MoS$_2$ | Cu | MoS$_2$ |
| Heads | 100 | 8.53 | 78.75 | 100 | 100 |
| Conc. | 20.8 | 35.44 | 12.40 | 86.4 | 3.3 |
| Tails. | 79.2 | 1.46 | 96.17 | 13.6 | 96.7 |

*Example IV.*—A pulp of the same material and of the same consistency as indicated in Example I was first conditioned with a 2.5% water solution of starch prepared as heretofore described, a total amount of this solution corresponding to 2.2 pounds of the starch contained therein being added during an agitation period of ten minutes. The pulp was then treated in the flotation machine with 0.5 pound of potassium ethyl xanthate and 0.3 pound of Hercules Yarmor pine oil, the frothing period of this treatment being fifteen minutes, during which a primary concentrate (Conc. 1 in the table) was floated and removed. The remaining pulp was then reconditioned for five minutes with a further amount of the same water-starch solution corresponding to 1.1 pounds of the starch contained therein, whereupon another concentrate (Conc. 2 in the table) was obtained by treatment in the flotation machine with 0.4 pound of caustic soda, 0.4 pound of potassium amyl xanthate, and 0.3 pound of Hercules Yarmor pine oil, the frothing period of this second treatment being ten minutes. The results were as follows:

|  | Weight, percent | Percent assay | | Percent distribution | |
|---|---|---|---|---|---|
|  |  | Cu | MoS$_2$ | Cu | MoS$_2$ |
| Heads | 100 | 9.18 | 71.9 | 100 | 100 |
| Conc. 1 | 20.2 | 38.4 | 10.0 | 84.5 | 2.8 |
| Conc. 2 | 3.3 | 16.6 | 56.0 | 6.0 | 2.6 |
| Tails | 76.5 | 1.14 | 89.04 | 9.5 | 94.6 |

*Example V.*—Utah Copper Company ore of a degree of fineness to pass through a screen of ten meshes to the lineal inch was made up with water to a pulp of 50% solids, which was then reground for ten minutes with 2.5 pounds of lime and 0.04 pound of sodium cyanide. Upon dilution to a consistency of about 18% solids, the pulp was agitated with an amount of the aforedescribed water-caustic-starch solution corresponding to 0.2 pound of the caustic-starch mixture contained therein, 0.02 pound of sodium ethyl xanthate, and 0.25 pound of cresylic acid, and then frothed in the flotation machine for six minutes. A copper float (Conc. 1 in the table) was obtained by this treatment, which was removed. The remaining material was further conditioned for two minutes with 0.04 pound of sodium ethyl xanthate, 0.1 pound of kerosene, and 0.1 pound of General Naval Stores No. 5 pine oil, whereupon it was again frothed in the flotation machine for five minutes, a copper-molybdenum float (Conc. 2 in the table) being obtained by this second treatment.

|  | Weight, percent | Percent assay | | | Percent distribution | | |
|---|---|---|---|---|---|---|---|
|  |  | Au | Cu | MoS$_2$ | Au | Cu | MoS$_2$ |
| Heads | 100 | 0.0152 | 1.04 | 0.0738 | 100 | 100 | 100 |
| Conc. 1 | 3.1 | 0.375 | 30.80 | 0.709 | 76.6 | 91.7 | 29.8 |
| Conc. 2 | .81 | 0.048 | 2.82 | 5.8 | 2.6 | 2.2 | 63.7 |
| Tails | 96.09 | 0.0033 | 0.066 | 0.005 | 20.8 | 6.1 | 6.5 |

*Comparative test 1*

Employing the same ore as indicated in Example V, the identical procedures given in connection with the first treatment were again followed, except that the water-caustic-starch solution was not used, the results being as follows:

|  | Weight, percent | Percent assay | | | Percent distribution | | |
|---|---|---|---|---|---|---|---|
|  |  | Au | Cu | MoS$_2$ | Au | Cu | MoS$_2$ |
| Heads | 100 | 0.0159 | 1.035 | 0.0615 | 100 | 100 | 100 |
| Conc. | 3.25 | 0.358 | 29.88 | 1.58 | 73.2 | 93.84 | 83.5 |
| Tails | 96.75 | 0.0044 | 0.066 | 0.0105 | 26.8 | 6.16 | 16.5 |

*Example VI.*—A pulp of Arizona Molybdenum Corporation ore of a degree of fineness to pass through a screen of ten meshes to the lineal inch was reground for fifteen minutes, at 50% solids, with 2 pounds of lime. The reground pulp was diluted to about 18% solids, and conditioned first for ten minutes with 0.75 pound of starch added as a 1% water solution prepared as heretofore described and then for two minutes with 0.04 pound of sodium ethyl xanthate and 0.25 pound of cresylic acid. Thereafter it was frothed for five minutes in the flotation machine and the froth (Conc. 1 in the table) removed. The remaining pulp was then conditioned for two minutes with 0.2 pound of kerosene and 0.2 pound of General Naval Stores No. 5 pine oil, whereupon it was frothed in the flotation machine for five minutes and the froth (Conc. 2 in the table) removed. As shown by the table, the first concentrate constituted a concentrate of copper sulphides, while the second a concentrate of molybdenite.

|  | Weight, percent | Percent assays | | Percent distribution | |
|---|---|---|---|---|---|
|  |  | Cu | MoS$_2$ | Cu | MoS$_2$ |
| Heads | 100 | 1.649 | 4.048 | 100 | 100 |
| Conc. 1 | 5.63 | 26.56 | 12.3 | 90.70 | 17.1 |
| Conc. 2 | 4.53 | 1.76 | 71.1 | 4.84 | 79.57 |
| Tails | 89.94 | 0.082 | 0.15 | 4.46 | 3.33 |

*Example VII.*—The same ore as indicated in Example VI was made up into a neutral pulp of 50% solids, which was reground for fifteen minutes. The reground pulp was diluted to about 18% solids, conditioned for ten minutes with an amount of the same 1% water-starch solution corresponding to 1.5 pounds of the starch contained therein, further conditioned for two minutes with 0.04 pound of American Cyanamid Company "sodium aeroflot" and 0.25 pound of cresylic acid, and finally frothed in the flotation machine for five minutes, yielding concentrate 1 of the table. The remaining pulp was conditioned for two minutes with 0.4 pound of kerosene, 0.2 pound of General Naval Stores No. 5 pine oil, and 0.04 pound of American Cyanamid Company "sodium aeroflot", and frothed in the flotation machine for ten minutes, yielding concentrate 2 of the table.

|  | Weight, percent | Percent assays | | Percent distribution | |
|---|---|---|---|---|---|
|  |  | Cu | MoS$_2$ | Cu | MoS$_2$ |
| Heads | 100 | 1.749 | 4.007 | 100 | 100 |
| Conc. 1 | 4.92 | 25.12 | 8.44 | 70.65 | 10.36 |
| Conc. 2 | 5.62 | 4.36 | 60.8 | 14.01 | 85.29 |
| Tails | 89.46 | 0.30 | 0.195 | 15.34 | 4.35 |

*Example VIII.*—The same ore as indicated in Example VI was made up into a neutral pulp of 50% solids. This pulp was reground for fifteen minutes, diluted to about 18% solids, and acidified by agitation for ten minutes with 45 pounds of sulphuric acid. It was then further conditioned first for ten minutes with an amount of the same 1% water-starch solution corresponding to 2 pounds of the starch contained therein, and thereafter for two minutes with 0.15 pound of "Minerec B" and 0.25 pound of cresylic acid, whereupon it was frothed in the flotation machine for five minutes and concentrate 1 of the table removed. The remaining pulp was conditioned for two minutes with 0.5 pound of kerosene, 0.1 pound of General Naval Stores No. 5 pine oil, and 0.2 pound of blast furnace creosote, whereupon it was frothed in the flotation machine for ten minutes and concentrate 2 of the table removed. The remaining pulp was still acid by litmus paper test, but was made alkaline, at a pH of about 7.8, by agitation for five minutes with 20 pounds of soda ash. Further conditioning was carried out with 0.75 pound of "Minerec B" and 0.25 pound of cresylic acid, whereupon the pulp was frothed in the flotation machine for eight minutes, yielding concentrate 3 of the table.

|  | Weight, percent | Percent assays | | Percent distribution | |
| --- | --- | --- | --- | --- | --- |
|  |  | Cu | MoS$_2$ | Cu | MoS$_2$ |
| Heads | 100 | 1.734 | 4.055 | 100 | 100 |
| Conc. 1 | 5.96 | 26.72 | 3.16 | 91.83 | 4.64 |
| Conc. 2 | 1.41 | 3.88 | 7.21 | 3.16 | 2.51 |
| Conc. 3 | 5.06 | .68 | 70.0 | 1.98 | 87.34 |
| Tails | 87.57 | .06 | .255 | 3.03 | 5.51 |
| Concs. 1 and 2 | 7.37 | 22.3 | 3.94 | 94.99 | 7.15 |

*Example IX.*—A pulp of the same ore as indicated in Example VI was reground for fifteen minutes, at 50% solids, with 2 pounds of sodium carbonate. The reground pulp was diluted to about 18% solids, conditioned for ten minutes with an amount of the same water-caustic-starch solution as heretofore described corresponding to 1 pound of the caustic-starch mixture contained therein, further conditioned for two minutes with 0.04 pound of sodium ethyl xanthate and 0.25 pound of cresylic acid, and then frothed in the flotation machine for ten minutes, whereby concentrate 1 of the table was obtained. The remaining pulp was conditioned for two minutes with 0.02 pound of sodium ethyl xanthate, 0.5 pound of kerosene, and 0.25 pound of General Naval Stores No. 5 pine oil, and then frothed in the flotation machine for fifteen minutes, whereby concentrate 2 of the table was obtained.

|  | Weight, percent | Percent assays | | Percent distribution | |
| --- | --- | --- | --- | --- | --- |
|  |  | Cu | MoS$_2$ | Cu | MoS$_2$ |
| Heads | 100 | 1.821 | 4.111 | 100 | 100 |
| Conc. 1 | 6.17 | 24.4 | 7.03 | 82.68 | 10.55 |
| Conc. 2 | 6.38 | 2.2 | 57.3 | 7.71 | 88.92 |
| Tails | 87.45 | 0.20 | 0.025 | 9.61 | 0.53 |

*Example X.*—A pulp of the same ore as indicated in Example VI was reground for fifteen minutes, at 50% solids, with 2 pounds of sodium carbonate. The reground pulp was diluted to about 18% solids, conditioned for ten minutes with an amount of the aforedescribed water-caustic-starch solution corresponding to 1 pound of the caustic-starch mixture contained therein, further conditioned for two minutes with 0.06 pound of American Cyanamid Company "sodium aeroflot" and 0.25 pound of cresylic acid, and then frothed in the flotation machine for fourteen minutes, whereby concentrate 1 of the table was obtained. The remaining pulp was conditioned for two minutes with 0.4 pound of kerosene and 0.2 pound of General Naval Stores No. 5 pine oil, and then frothed in the flotation machine for ten minutes, whereby concentrate 2 of the table was obtained.

|  | Weight, percent | Percent assays | | Percent distribution | |
| --- | --- | --- | --- | --- | --- |
|  |  | Cu | MoS$_2$ | Cu | MoS$_2$ |
| Heads | 100 | 1.683 | 3.883 | 100 | 100 |
| Conc. 1 | 6.43 | 22.32 | 9.56 | 85.3 | 15.83 |
| Conc. 2 | 4.62 | 1.12 | 68.6 | 3.07 | 81.63 |
| Tails | 88.95 | 0.22 | 0.111 | 11.63 | 2.54 |

*Example XI.*—Again the same ore as indicated in Example VI was taken and was formed into a pulp of 50% solids, which was reground for fifteen minutes with 2 pounds of sodium carbonate. The reground pulp was diluted to about 18% solids and first conditioned with a 1% aqueous solution of dried blood, an amount of this solution corresponding to 0.75 pound of the blood contained therein being added during an agitation period of ten minutes. It was further conditioned for two minutes with 0.04 pound of sodium ethyl xanthate and 0.25 pound of cresylic acid, and then frothed in the flotation machine for ten minutes, whereby concentrate 1 of the table was obtained. The remaining pulp was conditioned for two minutes with 0.02 pound of sodium ethyl xanthate, 0.8 pound of kerosene, and 0.2 pound of General Naval Stores No. 5 pine oil, and then frothed in the flotation machine for twenty minutes, whereby concentrate 2 of the table was obtained.

|  | Weight, percent | Percent assays | | Percent distribution | |
| --- | --- | --- | --- | --- | --- |
|  |  | Cu | MoS$_2$ | Cu | MoS$_2$ |
| Heads | 100 | 1.666 | 3.834 | 100 | 100 |
| Conc. 1 | 11.29 | 11.6 | 5.37 | 78.59 | 15.81 |
| Conc. 2 | 9.09 | 3.4 | 35.3 | 18.54 | 83.67 |
| Tails | 79.72 | 0.06 | 0.025 | 2.87 | 0.52 |

*Example XII.*—A pulp of the same ore as indicated in Example VI was reground for fifteen minutes, at 50% solids, with 2 pounds of sodium carbonate. The reground ore was diluted to about 18% solids, conditioned for ten minutes with 1 pound of licorice root added as a 1% aqueous suspension, further conditioned for two minutes with 0.04 pound of sodium ethyl xanthate and 0.25 pound of cresylic acid, and then frothed in the flotation machine for six minutes, yielding concentrate 1 of the table. The remaining pulp was conditioned for two minutes with 0.8 pound of kerosene and 0.2 pound of General Naval Stores No. 5 pine oil, and then frothed in the flotation machine for ten minutes, yielding concentrate 2 of the table.

|  | Weight, percent | Percent assays | | Percent distribution | |
| --- | --- | --- | --- | --- | --- |
|  |  | Cu | MoS$_2$ | Cu | MoS$_2$ |
| Heads | 100 | 1.681 | 4.16 | 100 | 100 |
| Conc. 1 | 5.91 | 24.08 | 8.16 | 84.66 | 11.59 |
| Conc. 2 | 9.41 | 2.2 | 38.20 | 12.32 | 86.41 |
| Tails | 84.68 | 0.06 | 0.098 | 3.02 | 2.00 |

*Example XIII.*—A pulp of the same ore as indicated in Example VI was reground for fifteen minutes, at 50% solids, with 2 pounds of sodium carbonate. The reground pulp was diluted to about 18% solids, conditioned for ten minutes with 0.2 pound of saponin added as a 1% aqueous solution, further conditioned for two minutes with 0.08 pound of sodium ethyl xanthate and 0.25 pound of cresylic acid, and then frothed in the flotation machine for seven minutes, concentrate 1 of the table being obtained. The remaining pulp was conditioned for two minutes with 0.2 pound of kerosene and 0.2 pound of General Naval Stores No. 5 pine oil, and then frothed in the flotation machine for another seven minutes, concentrate 2 of the table being obtained.

| | Weight, percent | Percent assays | | Percent distribution | |
|---|---|---|---|---|---|
| | | Cu | MoS$_2$ | Cu | MoS$_2$ |
| Heads | 100 | 1.553 | 3.745 | 100 | 100 |
| Conc. 1 | 6.79 | 18.88 | 6.04 | 82.54 | 10.95 |
| Conc. 2 | 4.77 | 2.72 | 68.28 | 8.35 | 86.97 |
| Tails | 88.44 | 0.16 | 0.088 | 9.11 | 2.08 |

*Example XIV.*—Again the same ore as indicated in Example VI was taken and was formed into a pulp of 50% solids. This pulp was reground for fifteen minutes with 2 pounds of lime, diluted to about 18% solids, and first conditioned with a 1% aqueous solution of crude dextrose, which solution was added in stages until a total amount corresponding to 2 pounds of the dextrose contained therein was present in the pulp, the total period of agitation being thirty minutes. Further conditioning was carried out for two minutes with 0.02 pound of sodium ethyl xanthate and 0.25 pound of cresylic acid, whereupon the pulp was frothed in the flotation machine for five minutes and concentrate 1 of the table removed. The remaining pulp was conditioned for two minutes with 0.02 pound of sodium ethyl xanthate, 0.2 pound of kerosene, and 0.2 pound of General Naval Stores No. 5 pine oil, whereupon it was frothed in the flotation machine for ten minutes and concentrate 2 of the table removed.

| | Weight, percent | Percent assays | | Percent distribution | |
|---|---|---|---|---|---|
| | | Cu | MoS$_2$ | Cu | MoS$_2$ |
| Heads | 100 | 1.638 | 3.753 | 100 | 100 |
| Conc. 1 | 5.61 | 26.08 | 12.35 | 89.32 | 18.46 |
| Conc. 2 | 4.52 | 2.28 | 67.0 | 6.29 | 80.70 |
| Tails | 89.87 | 0.08 | 0.035 | 4.39 | 0.84 |

*Example XV.*—The same ore as indicated in Example VI was made into a neutral pulp of 50% solids, which was then reground for fifteen minutes. The reground pulp was diluted to about 18% solids, and first conditioned with 0.5 pound of a mixture of casein and caustic soda containing 0.2 gram of caustic soda for each gram of casein, which mixture was added as a 1% aqueous solution. Further conditioning was carried out for two minutes with 0.14 pound of sodium ethyl xanthate and 0.25 pound of cresylic acid, whereupon the pulp was frothed in the flotation machine for ten minutes, yielding concentrate 1 of the table. The remaining pulp was conditioned for two minutes with 0.2 pound of kerosene and 0.1 pound of General Naval Stores No. 5 pine oil, whereupon it was frothed in the flotation machine for seven minutes, yielding concentrate 2 of the table.

| | Weight, percent | Percent assays | | Percent distribution | |
|---|---|---|---|---|---|
| | | Cu | MoS$_2$ | Cu | MoS$_2$ |
| Heads | 100 | 1.501 | 4.26 | 100 | 100 |
| Conc. 1 | 12.71 | 10.32 | 8.72 | 87.39 | 26.01 |
| Conc. 2 | 5.65 | 1.76 | 53.2 | 6.63 | 70.56 |
| Tails | 81.64 | 0.11 | 0.179 | 5.98 | 3.43 |

*Example XVI.*—A pulp of the same ore as indicated in Example VI was reground for fifteen minutes, at 50% solids, with 2 pounds of sodium carbonate. The reground pulp was diluted to about 18% solids, and first conditioned with a 1% aqueous solution of animal glue, a total amount of this solution corresponding to 2 pounds of the glue contained therein being added during a total period of agitation of eighteen minutes. It was then further conditioned for two minutes with 0.28 pound of sodium ethyl xanthate and 0.25 pound of cresylic acid, and thereafter frothed in the flotation machine for ten minutes, concentrate 1 of the table being removed. The remaining pulp was conditioned for two minutes with 0.5 pound of kerosene and 0.35 pound of General Naval Stores No. 5 pine oil, whereupon it was frothed in the flotation machine for fifteen minutes, yielding concentrate 2 of the table. Still another treatment was effected by conditioning the remaining pulp for two minutes with 0.3 pound of tannic acid and 0.2 pound of kerosene, and thereafter subjecting it to a frothing period of ten minutes in the flotation machine, concentrate 3 of the table being thus obtained. The tannic acid used in this last treatment was very effective in floating molybdenite, which was strongly depressed by the animal glue.

| | Weight, percent | Percent assays | | Percent distribution | |
|---|---|---|---|---|---|
| | | Cu | MoS$_2$ | Cu | MoS$_2$ |
| Heads | 100 | 1.664 | 3.997 | 100 | 100 |
| Conc. 1 | 8.76 | 16.64 | 9.84 | 87.61 | 21.57 |
| Conc. 2 | 6.04 | 0.96 | 41.0 | 3.49 | 61.95 |
| Conc. 3 | 3.22 | 1.80 | 19.1 | 3.48 | 15.39 |
| Tails | 81.98 | 0.11 | 0.053 | 5.42 | 1.09 |
| Concs. 2 and 3 | 9.26 | 1.25 | 33.4 | 6.97 | 77.34 |

*Comparative test 2*

This test is intended to show the effect of lime when employed without an organic colloid. A pulp of the same ore as indicated in Example VI was reground for fifteen minutes, at 15% solids, with 2 pounds of lime. The reground pulp was diluted to about 18% solids, conditioned for two minutes with 0.04 pound of sodium ethyl xanthate and 0.25 pound of cresylic acid, and then frothed in the flotation machine for five minutes, concentrate 1 of the table being obtained. The remaining pulp was conditioned for two minutes with 0.02 pound of sodium ethyl xanthate, 0.2 pound of kerosene, and 0.1 pound of General Naval Stores No. 5 pine oil, whereupon it was frothed in the flotation machine for seven minutes, yielding concentrate 2 of the table.

| | Weight, percent | Percent assays | | Percent distribution | |
|---|---|---|---|---|---|
| | | Cu | MoS$_2$ | Cu | MoS$_2$ |
| Heads | 100 | 1.594 | 3.849 | 100 | 100 |
| Conc. 1 | 7.97 | 18.48 | 34.84 | 92.4 | 72.13 |
| Conc. 2 | 2.12 | 2.24 | 48.52 | 2.98 | 26.72 |
| Tails | 89.91 | 0.082 | 0.049 | 4.62 | 1.15 |

*Comparative test 3*

This test is intended to show the effect of sodium carbonate when employed without an organic colloid. A pulp of the same ore as indicated in Example VI was reground for fifteen minutes, at 50% solids, with 2 pounds of sodium carbonate. Upon dilution to about 18% solids, it was faintly alkaline by phenolphthalein test. Conditioning was carried out for two minutes with 0.4 pound of sodium ethyl xanthate and 0.25 pound of cresylic acid, whereupon the pulp was subjected to a frothing period of eight minutes in the flotation machine, the results being as follows:

|  | Weight, percent | Percent assays | | Percent distribution | |
| --- | --- | --- | --- | --- | --- |
|  |  | Cu | MoS$_2$ | Cu | MoS$_2$ |
| Heads | 100 | 1.772 | 3.975 | 100 | 100 |
| Conc. | 10.83 | 14.72 | 36.5 | 89.94 | 99.44 |
| Tails. | 89.17 | 0.2 | 0.025 | 10.06 | 0.56 |

None of the procedures described in detail herein should be interpreted as limiting the invention, these procedures being capable of being modified in many ways without departing from its spirit.

What is claimed is:

1. A process of ore concentration by flotation for the separation of molybdenite from copper sulphide, which consists in agitating a pulp of the suitably ground material containing molybdenite and copper sulphide in the presence of an organic protective colloid to selectively inhibit flotation of molybdenite, and producing a flotation concentrate containing copper sulphide.

2. A process of ore concentration by flotation for the separation of molybdenite from copper sulphide, which consists in agitating a pulp of the suitably ground material containing molybdenite and copper sulphide in the presence of starch to selectively inhibit flotation of molybdenite, and producing a flotation concentrate containing copper sulphide.

3. A process of ore concentration by flotation for the separation of molybdenite from copper sulphide, which consists in agitating a pulp of the suitably ground material containing molybdenite and copper sulphide in the presence of a solution of starch in caustic soda to selectively inhibit flotation of molybdenite, and producing a flotation concentrate containing copper sulphide.

4. A process of ore concentration by flotation for the separation of molybdenite from copper sulphide, which consists in agitating a pulp of the suitably ground material containing molybdenite and copper sulphide in the presence of a caustic starch solution containing 80 parts of starch and 20 parts of caustic soda to selectively inhibit flotation of molybdenite, and producing a flotation concentrate containing copper sulphide.

5. A process of ore concentration by flotation for the separation of molybdenite from copper sulphide, which consists in agitating a pulp of the suitably ground material containing molybdenite and copper sulphide in the presence of an organic protective colloid and lime to selectively inhibit flotation of molybdenite, and producing a flotation concentrate containing copper sulphide.

6. A process of ore concentration by flotation for the separation of molybdenite from copper sulphide, which consists in agitating a pulp of the suitably ground material containing molybdenite and copper sulphide in the presence of starch and lime to selectively inhibit flotation of molybdenite, and producing a flotation concentrate containing copper sulphide.

7. A process of ore concentration by flotation for the separation of molybdenite from copper sulphide, which consists in agitating an alkaline pulp of the suitably ground material containing molybdenite and copper sulphide in the presence of an organic protective colloid and flotation agents so as to produce a floating froth relatively poor in molybdenite and relatively rich in copper sulphide, and removing the froth.

8. A process of ore concentration by flotation for the separation of molybdenite from copper sulphide, which consists in agitating an alkaline pulp of the suitably ground material containing molybdenite and copper sulphide in the presence of starch and flotation agents so as to produce a floating froth relatively poor in molybdenite and relatively rich in copper sulphide, and removing the froth.

9. A process of ore concentration by flotation for the separation of molybdenite from copper sulphide, which consists in agitating a pulp of the suitably ground material containing molybdenite and copper sulphide in the presence of lime and an organic protective colloid and flotation agents so as to produce a floating froth relatively poor in molybdenite and relatively rich in copper sulphide, the lime being present in the pulp in amount sufficient to render it alkaline, and removing the froth.

10. A process of ore concentration by flotation for the separation of molybdenite from copper sulphide, which consists in agitating a pulp of the suitably ground material containing molybdenite and copper sulphide in the presence of lime and starch and flotation agents so as to produce a floating froth relatively poor in molybdenite and relatively rich in copper sulphide, the lime being present in the pulp in amount sufficient to render it alkaline, and removing the froth.

11. A process of concentrating an ore containing molybdenite and copper sulphide by flotation, which consists in agitating a pulp of the suitably ground ore containing molybdenite and copper sulphide in the presence of an organic protective colloid to selectively inhibit flotation of molybdenite, treating the pulp so as to produce a flotation concentrate containing copper sulphide, and treating the remaining pulp in an alkaline state with flotation agents so as to produce a froth flotation concentrate containing molybdenite.

12. A process of concentrating an ore containing molybdenite and copper sulphide by flotation, which consists in agitating a pulp of the suitably ground ore containing molybdenite and copper sulphide in the presence of an organic protective colloid to selectively inhibit flotation of molybdenite, treating the pulp so as to produce a flotation concentrate containing copper sulphide, and treating the remaining pulp with flotation agents including tannic acid so as to produce a froth flotation concentrate containing molybdenite.

13. A process of concentrating an ore containing molybdenite and copper sulphide by flotation, which consists in agitating a pulp of the suitably ground ore containing molybdenite and copper sulphide in the presence of an organic protective colloid to selectively inhibit flotation of molybdenite, treating the pulp so as to produce a flotation concentrate containing copper sulphide, and treating the remaining pulp with fuel oil, a frothing agent obtained by the distillation of pine wood, and tannic acid so as to produce a froth flotation concentrate containing molybdenite.

14. A process of concentrating an ore containing molybdenite and copper sulphide by flotation, which consists in agitating a pulp of the suitably ground ore containing molybdenite and copper sulphide in the presence of an organic protective colloid to selectively inhibit flotation of molybdenite, treating the pulp so as to produce a flotation concentrate containing copper sulphide, and treating the remaining pulp with kerosene and pine oil and tannic acid so as to produce a froth flotation concentrate containing molybdenite.

15. A process of concentrating an ore containing molybdenite and copper sulphide by flotation, which consists in agitating a pulp of the suitably ground ore containing molybdenite and copper sulphide in the presence of an organic protective colloid to selectively inhibit flotation of molybdenite, treating the pulp so as to produce a flotation concentrate containing copper sulphide, and treating the remaining pulp in an alkaline state with flotation agents including tannic acid so as to produce a froth flotation concentrate containing molybdenite.

16. A process of concentrating an ore containing molybdenite and copper sulphide by flotation, which consists in agitating a pulp of the suitably ground ore containing molybdenite and copper sulphide in the presence of starch to selectively inhibit flotation of molybdenite, treating the pulp so as to produce a flotation concentrate containing copper sulphide, and treating the remaining pulp in an alkaline state with kerosene and pine oil and tannic acid so as to produce a froth flotation concentrate containing molybdenite.

17. A process of concentrating an ore containing molybdenite and copper sulphide, which consists in treating a pulp of the suitably ground ore containing molybdenite and copper sulphide so as to produce a primary concentrate consisting mainly of molybdenite and copper sulphide, agitating a pulp of the primary concentrate with an organic protective colloid and flotation agents including a soluble lead salt so as to produce a floating froth relatively poor in molybdenite and relatively rich in copper sulphide, and removing the froth.

18. A process of concentrating an ore containing molybdenite and copper sulphide, which consists in treating a pulp of the suitably ground ore containing molybdenite and copper sulphide so as to produce a primary concentrate consisting mainly of molybdenite and copper sulphide, agitating a pulp of the primary concentrate with an organic protective colloid and flotation agents including lead acetate so as to produce a floating froth relatively poor in molybdenite and relatively rich in copper sulphide, and removing the froth.

19. A process of concentrating an ore containing molybdenite and copper sulphide, which consists in treating a pulp of the suitably ground ore containing molybdenite and copper sulphide so as to produce a primary concentrate consisting mainly of molybdenite and copper sulphide, agitating a pulp of the primary concentrate in an alkaline state with starch and flotation agents including a soluble lead salt so as to produce a floating froth relatively poor in molybdenite and relatively rich in copper sulphide, and removing the froth.

20. A process of ore concentration by flotation for the separation of molybdenite from copper sulphide, which consists in agitating a pulp of the suitably ground material containing molybdenite and copper sulphide in the presence of saponin to selectively inhibit flotation of molybdenite, and producing a flotation concentrate containing copper sulphide.

21. A process of ore concentration by flotation for the separation of molybdenite from copper sulphide, which consists in agitating a pulp of the suitably ground material containing molybdenite and copper sulphide in the presence of crude dextrose to selectively inhibit flotation of molybdenite, and producing a flotation concentrate containing copper sulphide.

22. A process of concentrating an ore containing molybdenite and copper sulphide, which consists in grinding the ore containing molybdenite and copper sulphide with lime, adding water to the ground ore to form a freely flowing pulp, agitating the pulp with an organic protective colloid and flotation agents so as to produce a floating froth relatively poor in molybdenite and relatively rich in copper sulphide, removing the froth, and treating the remaining pulp so as to recover molybdenite in a second floating froth.

23. A process of concentrating an ore containing molybdenite and copper sulphide, which consists in grinding the ore containing molybdenite and copper sulphide with lime, adding water to the ground ore to form a freely flowing pulp, agitating the pulp with starch and flotation agents so as to produce a floating froth relatively poor in molybdenite and relatively rich in copper sulphide, removing the froth, and treating the remaining pulp so as to recover molybdenite in a second floating froth.

24. A process of ore concentration by flotation for the separation of molybdenite from chalcocite, which consists in agitating a pulp of the suitably ground material containing molybdenite and chalcocite in the presence of an organic protective colloid to selectively inhibit flotation of molybdenite, and producing a flotation concentrate containing chalcocite.

25. A process of ore concentration by flotation for the separation of molybdenite from chalcocite, which consists in agitating a pulp of the suitably ground material containing molybdenite and chalcocite in the presence of starch to selectively inhibit flotation of molybdenite, and producing a flotation concentrate containing chalcocite.

26. A process of concentrating an ore containing molybdenite and copper sulphide by flotation, which consists in agitating a pulp of the suitably ground ore containing molybdenite and copper sulphide in the presence of an organic protective colloid to selectively inhibit flotation of molybdenite, treating the pulp so as to produce a flotation concentrate containing copper sulphide, and treating the remaining pulp with a mineral hydrocarbon oil and a frothing agent obtained by the distillation of pine wood so as to produce a flotation concentrate containing molybdenite.

27. A process of concentrating an ore containing molybdenite and copper sulphide by flotation, which consists in agitating a pulp of the suitably ground ore containing moylbdenite and copper sulphide in the presence of an organic protective colloid to selectively inhibit flotation of molybdenite, treating the pulp so as to produce a flotation concentrate containing copper sulphide, and treating the remaining pulp with kerosene and pine oil so as to produce a flotation concentrate containing molybdenite.

28. A process of concentrating an ore containing molybdenite and copper sulphide by flotation, which consists in grinding the ore containing molybdenite and copper sulphide with lime, adding water to the ground ore to form a freely flowing pulp, agitating the pulp in the presence of a small quantity of starch to selectively inhibit flotation of molybdenite, treating the pulp so as to produce a flotation concentrate containing copper sulphide, and subsequently treating the remaining pulp with kerosene and pine oil so as to produce a flotation concentrate containing molybdenite.

29. A process of concentrating an ore containing molybdenite and copper sulphide, which consists in treating a pulp of the suitably ground ore containing molybdenite and copper sulphide so as to produce a primary concentrate consisting mainly of molybdenite and copper sulphide, agitating a pulp of the primary concentrate with an organic protective colloid and flotation agents so as to produce a floating froth relatively poor in molybdenite and relatively rich in copper sulphide, and removing the froth.

30. A process of concentrating an ore containing molybdenite and copper sulphide, which consists in treating a pulp of the suitably ground ore containing molybdenite and copper sulphide so as to produce a primary concentrate consisting mainly of molybdenite and copper sulphide, agitating a pulp of the primary concentrate with starch and flotation agents so as to produce a floating froth relatively poor in molybdenite and relatively rich in copper sulphide, and removing the forth.

31. A process of concentrating an ore containing molybdenite and copper sulphide, which consists in treating a pulp of the suitably ground ore containing molybdenite and copper sulphide so as to produce a primary concentrate consisting mainly of molybdenite and copper sulphide, agitating a pulp of the primary concentrate in an alkaline state with starch and flotation agents so as to produce a floating froth relatively poor in molybdenite and relatively rich in copper sulphide, and removing the froth.

32. A process of concentrating an ore containing molybdenite and copper sulphide by flotation, which consists in agitating a pulp of the suitably ground ore containing molybdenite and copper sulphide in the presence of an organic protective colloid to selectively inhibit flotation of molybdenite, treating the pulp so as to produce a flotation concentrate containing copper sulphide, and treating the remaining pulp with flotation agents so as to produce a froth flotation concentrate containing molybdenite.

EARL H. BROWN.

CERTIFICATE OF CORRECTION.

Patent No. 2,070,076. February 9, 1937.

EARL H. BROWN.

It is hereby certified that error appears in the printed specification of the above numbered patent requiring correction as follows: Page 1, first column, line 39, for "that" read they; page 5, first column, in the last table, column one, for "Conc. 2" read Conc. 1; page 6, second column, line 7, claim 7, for "flotating" read floating; and that the said Letters Patent should be read with these corrections therein that the same may conform to the record of the case in the Patent Office.

Signed and sealed this 8th day of June, A. D. 1937.

Henry Van Arsdale (Seal)

Acting Commissioner of Patents.

28. A process of concentrating an ore containing molybdenite and copper sulphide by flotation, which consists in grinding the ore containing molybdenite and copper sulphide with lime, adding water to the ground ore to form a freely flowing pulp, agitating the pulp in the presence of a small quantity of starch to selectively inhibit flotation of molybdenite, treating the pulp so as to produce a flotation concentrate containing copper sulphide, and subsequently treating the remaining pulp with kerosene and pine oil so as to produce a flotation concentrate containing molybdenite.

29. A process of concentrating an ore containing molybdenite and copper sulphide, which consists in treating a pulp of the suitably ground ore containing molybdenite and copper sulphide so as to produce a primary concentrate consisting mainly of molybdenite and copper sulphide, agitating a pulp of the primary concentrate with an organic protective colloid and flotation agents so as to produce a floating froth relatively poor in molybdenite and relatively rich in copper sulphide, and removing the froth.

30. A process of concentrating an ore containing molybdenite and copper sulphide, which consists in treating a pulp of the suitably ground ore containing molybdenite and copper sulphide so as to produce a primary concentrate consisting mainly of molybdenite and copper sulphide, agitating a pulp of the primary concentrate with starch and flotation agents so as to produce a floating froth relatively poor in molybdenite and relatively rich in copper sulphide, and removing the forth.

31. A process of concentrating an ore containing molybdenite and copper sulphide, which consists in treating a pulp of the suitably ground ore containing molybdenite and copper sulphide so as to produce a primary concentrate consisting mainly of molybdenite and copper sulphide, agitating a pulp of the primary concentrate in an alkaline state with starch and flotation agents so as to produce a floating froth relatively poor in molybdenite and relatively rich in copper sulphide, and removing the froth.

32. A process of concentrating an ore containing molybdenite and copper sulphide by flotation, which consists in agitating a pulp of the suitably ground ore containing molybdenite and copper sulphide in the presence of an organic protective colloid to selectively inhibit flotation of molybdenite, treating the pulp so as to produce a flotation concentrate containing copper sulphide, and treating the remaining pulp with flotation agents so as to produce a froth flotation concentrate containing molybdenite.

EARL H. BROWN.

CERTIFICATE OF CORRECTION.

Patent No. 2,070,076.  February 9, 1937.

EARL H. BROWN.

It is hereby certified that error appears in the printed specification of the above numbered patent requiring correction as follows: Page 1, first column, line 39, for "that" read they; page 5, first column, in the last table, column one, for "Conc. 2" read Conc. 1; page 6, second column, line 7, claim 7, for "flotating" read floating; and that the said Letters Patent should be read with these corrections therein that the same may conform to the record of the case in the Patent Office.

Signed and sealed this 8th day of June, A. D. 1937.

Henry Van Arsdale (Seal)  Acting Commissioner of Patents.

CERTIFICATE OF CORRECTION.

Patent No. 2,070,076.                                February 9, 1937.

EARL H. BROWN.

It is hereby certified that error appears in the printed specification of the above numbered patent requiring correction as follows: Page 1, first column, line 39, for "that" read they; page 5, first column, in the last table, column one, for "Conc. 2" read Conc. 1; page 6, second column, line 7, claim 7, for "flotating" read floating; and that the said Letters Patent should be read with these corrections therein that the same may conform to the record of the case in the Patent Office.

Signed and sealed this 8th day of June, A. D. 1937.

Henry Van Arsdale (Seal)                                    Acting Commissioner of Patents.